US012047509B2

(12) United States Patent
Seiler

(10) Patent No.: US 12,047,509 B2
(45) Date of Patent: Jul. 23, 2024

(54) PROCESSING SYSTEM USING A BLOCK-CHAIN FOR AUTHORIZING A USER OF A BUILDING OR VEHICLE

(71) Applicant: DAIMLER AG, Stuttgart (DE)

(72) Inventor: Christian Seiler, Fellbach-Schmiden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 445 days.

(21) Appl. No.: 17/414,469

(22) PCT Filed: Dec. 10, 2019

(86) PCT No.: PCT/EP2019/084436
§ 371 (c)(1),
(2) Date: Jun. 16, 2021

(87) PCT Pub. No.: WO2020/126675
PCT Pub. Date: Jun. 25, 2020

(65) Prior Publication Data
US 2022/0070003 A1  Mar. 3, 2022

(30) Foreign Application Priority Data

Dec. 19, 2018  (DE) ............... 10 2018 010 027.9

(51) Int. Cl.
*G06F 7/00* (2006.01)
*B60R 25/04* (2013.01)
(Continued)

(52) U.S. Cl.
CPC ............ *H04L 9/3231* (2013.01); *B60R 25/04* (2013.01); *B60R 25/24* (2013.01); *B60R 25/25* (2013.01);
(Continued)

(58) Field of Classification Search
CPC ....... H04L 9/3231; B60R 25/04; B60R 25/24; B60R 25/25; G07C 9/38; G07C 9/37; G06Q 2240/00
See application file for complete search history.

(56) References Cited

U.S. PATENT DOCUMENTS 9,985,964 B2   5/2018  Andrade
2017/0195336 A1   7/2017  Ouellette
(Continued)

FOREIGN PATENT DOCUMENTS

CH         713687 A1    10/2018
CN       108521418 A     9/2018
(Continued)

OTHER PUBLICATIONS

International Search Report mailed Feb. 26, 2020 in related/corresponding International Application No. PCT/EP2019/084436.
(Continued)

*Primary Examiner* — Adam M Alharbi
(74) *Attorney, Agent, or Firm* — PATENT PORTFOLIO BUILDERS PLLC

(57) ABSTRACT

A processing system for a plurality of users of a building or vehicle includes a number of local nodes arranged in the building or vehicle. Each local node stores a copy of a block-chain. A processing unit is coupled to the local nodes and receives a processing request of a user and verifies the processing request by comparing a piece of processing information with the stored block-chain on at least one of the local nodes, in order to grant access authorization to the user. The processing information includes a piece of information from biometric data of the user.

12 Claims, 1 Drawing Sheet

(51) Int. Cl.
*B60R 25/24* (2013.01)
*B60R 25/25* (2013.01)
*G07C 9/37* (2020.01)
*G07C 9/38* (2020.01)
*H04L 9/32* (2006.01)
*H04L 9/00* (2022.01)

(52) U.S. Cl.
CPC ............... *G07C 9/37* (2020.01); *G07C 9/38* (2020.01); *G06Q 2240/00* (2013.01); *H04L 9/50* (2022.05)

(56) References Cited

U.S. PATENT DOCUMENTS

| | | | |
|---|---|---|---|
| 2017/0295180 A1* | 10/2017 | Day | H04L 63/10 |
| 2017/0352215 A1 | 12/2017 | Maiwand et al. | |
| 2018/0012324 A1 | 1/2018 | Kelts | |
| 2018/0096121 A1 | 4/2018 | Goeringer et al. | |
| 2018/0126951 A1* | 5/2018 | Ricci | B60W 40/09 |
| 2018/0167217 A1 | 6/2018 | Brady et al. | |
| 2018/0234433 A1 | 8/2018 | Oberhauser et al. | |
| 2018/0293555 A1 | 10/2018 | Handoko et al. | |
| 2019/0190720 A1 | 6/2019 | Falk | |
| 2019/0319808 A1* | 10/2019 | Fallah | H04L 9/3239 |
| 2020/0092102 A1* | 3/2020 | Wang | H04W 12/06 |

FOREIGN PATENT DOCUMENTS

| | | |
|---|---|---|
| CN | 108805573 A | 11/2018 |
| CN | 109845189 A | 6/2019 |
| DE | 102017107147 A1 | 10/2017 |
| DE | 102016215914 A1 | 3/2018 |
| DE | 112016006077 T5 | 10/2018 |
| JP | 2017001615 A | 1/2017 |
| WO | 2018044282 A1 | 3/2018 |
| WO | 2018064645 A1 | 4/2018 |
| WO | 2018111302 A1 | 6/2018 |
| WO | 2018222211 A1 | 12/2018 |

OTHER PUBLICATIONS

Office Action created Aug. 12, 2019 in related/corresponding DE Application No. 10 2018 010 027.9.
Written Opinion mailed Feb. 26, 2020 in related/corresponding International Application No. PCT/EP2019/084436.
Office Action dated May 17, 2022 in related/corresponding JP Application No. 2021-534178.
Office Action dated Oct. 10, 2022 in related/corresponding CN Application No. 201980084860.9.

* cited by examiner

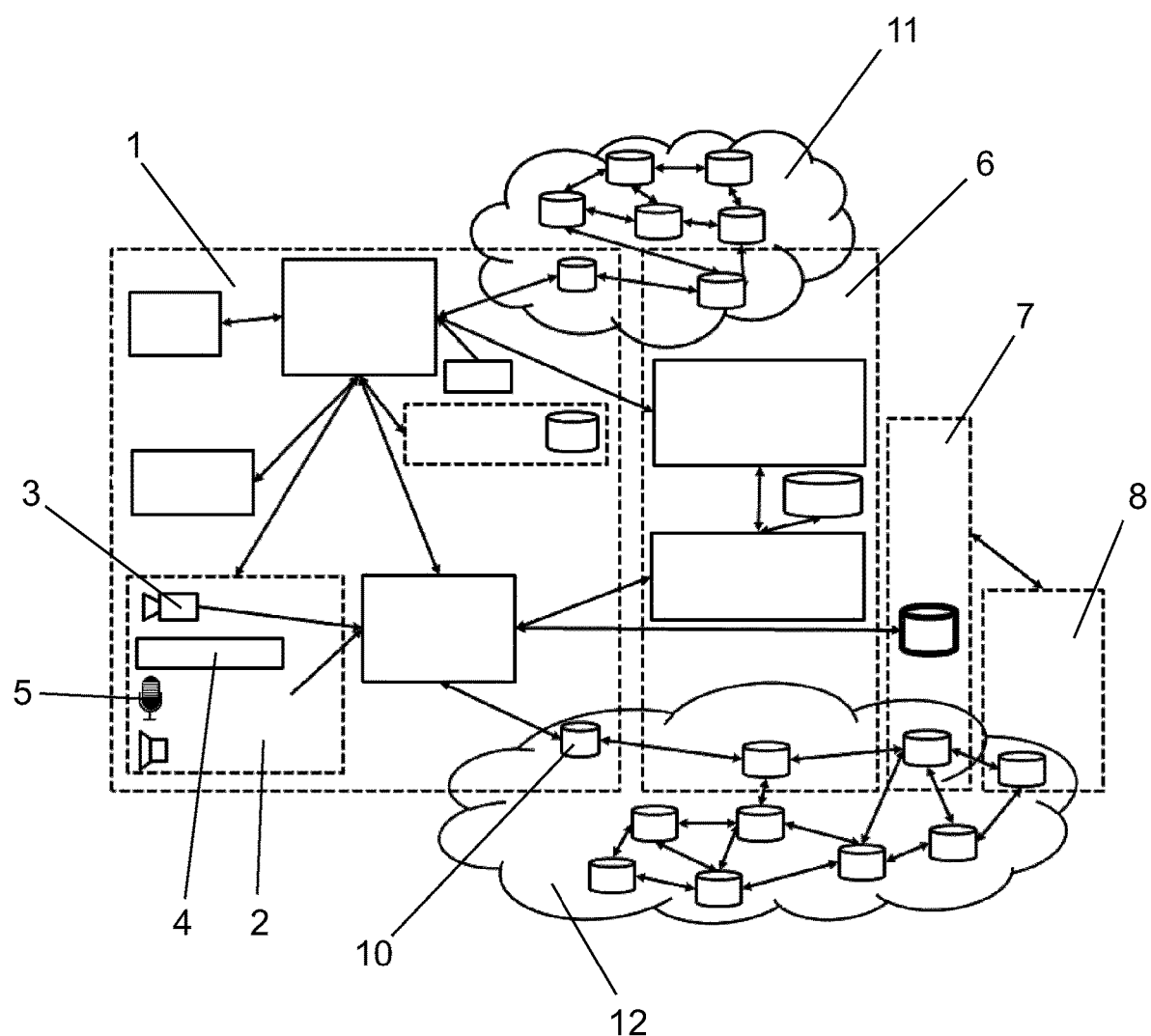

PROCESSING SYSTEM USING A BLOCK-CHAIN FOR AUTHORIZING A USER OF A BUILDING OR VEHICLE

BACKGROUND AND SUMMARY OF THE INVENTION

Exemplary embodiments of the invention relate to a processing system for a plurality of users of a building and/or a means of transport and a method for processing a plurality of users of a building and/or a means of transport, in particular a vehicle.

In order to enter into a building, into a means of transport, in particular into a vehicle, or into a restricted region, an authorized or valid person requires a mechanical or electronic key in order to pass through a door, a gate or similar. Remote-controlled entry using a Proprietary Centralized Backend System (PCBS) used by vehicle manufacturers is possible.

Systems and methods for managing digital identities are known from US 2018/0234433 A1. Moreover, reference can be made to US 2018/0293555 A1 as further prior art. Processing systems and processing methods for verifying processing of users or participants in an airplane are described therein.

A method for providing an identification using a terminal device is known from WO 2018/111302 A1.

It is known from DE 10 2017 107 147 A1 that mobile devices and other devices used in transactions or interactions with other computer systems can be identified by an abstract compilation of information obvious to the device.

A block-chain-based, multifactorial check of personal identity is known from DE 11 2016 006 077 T5.

It is known from WO 2018/064645 A1 that a distributed production platform and related techniques connect designers, manufacturers, consignors, and other units and simplify the process of production and delivery of new and existing products.

A method for requesting and using access rights for accessing access-controlled service devices is known from CH 713 687 A1, in which method access rights are requested by a reservation center by conveying request information via a request channel. The request information comprises an identification of the user of the access rights, to whose mobile communication terminal the requested access rights are conveyed via a communication network and are stored there in a storage module.

Systems of an electric vehicle and the operation thereof are described in US 2018/0126951A1, wherein authentication mechanisms for external persons or computers are provided, while the vehicle functions autonomously.

A system for providing dynamic access to a vehicle via a plurality of devices is known from US 2017/0352215 A1.

First block-chain applications for vehicles as means of transport are known. Here, a block-chain is a continuously extendable list of datasets, so-called blocks, which are interlinked to one another by means of cryptographic methods. The block-chain is distributed to the participating local nodes, in particular computers or computing units, and the local nodes add their contributions and their certifications of the block-chain. In addition, the individual blocks of the block chain are encrypted with different private keys, and the corresponding public keys are held against a piece of infrastructure. Thus, not only a tamper-proof transfer of the block-chain is ensured, but rather it is also ensured that the individual blocks cannot be changed without authorization.

Access to individual vehicle functions is granted if the information secured in the block-chain lies in the expected or target range for the function in the block-chain. A first securing provides the block-chain by means of the interlinking of the individual blocks and a second securing by means of the distribution of the block-chain to the participating nodes.

A disadvantage of these known processes is that the access authorization is coupled to a mobile terminal, such as a smartphone, that could be stolen from a user.

Exemplary embodiments of the present invention are directed to accessing a building and/or a means of transport, in particular a vehicle, wherein neither a mechanical or electronic key nor a mobile terminal is required, such that this must not also be carried by a user and thus cannot be thieved or stolen.

According to a first aspect of the invention, there is a processing system for a plurality of users of a building and/or a means of transport, in particular a vehicle. Here, the processing system comprises a plurality of local nodes arranged in the building and/or means of transport, wherein each local node is designed to store a copy of a block-chain, and a processing unit, which is coupled to the local nodes, and is designed to receive a processing request of a user and to verify the processing request by comparing a piece of processing information with the stored block-chain on at least one of the local nodes in order to grant access authorization to the user, wherein the processing information has a piece of information from biometric data of the user, and wherein a local node is provided from the plurality of local nodes, in which the biometric data of the user is stored, wherein, when access authorization is granted to the user in a station of the block-chain, the positive check result from this station is also entered into the block-chain, and the block-chain is distributed to the further nodes from the plurality of local nodes.

According to one aspect of the invention, the building and/or the means of transport has a current supply and an internet connection. Advantageously, the processing system according to the invention further has a Digital Identity Service Provider (DISP) that the user can trust, and which is secured using a Digital Identity Authority (DIA). The processing system according to the invention uses a virtual access method that does not require an app with an electronic key. Thus, the user does not have to carry any access key with them, and a seamless authentication using biometric data is made possible, which constitutes an independent and secure method for authorizing identity. A block-chain method is thus provided, such that the authorized vehicle users or users of a building manage without a smartphone and without a wallet.

According to a preferred exemplary embodiment of the invention, the piece of information from the biometric data includes at least one piece of information comprising genetic fingerprint, finger line image, gait, facial geometry, hand geometry, hand line structure, hand vein structure, iris, body odor, body size, lip movement, voice timbre, nailbed pattern, ear shape, retina, speech, typing behavior on keyboards, signature, handwriting, and dental impression of the user. Thus, a plurality of information from biometric data is available, and this can be used variably in order to thus obtain a secure identity authorization.

According to another preferred exemplary embodiment of the invention, the access authorization includes an authorization for the central locking system and/or an authorization for actuating individual doors of the means of transport.

Thus, individual doors or all doors of the means of transport can be actuated, i.e., opened and closed.

According to another preferred exemplary embodiment of the invention, the processing unit grants driving authorization to the user by means of the processing information, if the access authorization is granted, in order to deactivate an engine immobilizer of the means of transport.

According to a further preferred exemplary embodiment of the invention, the processing unit comprises a camera, a fingerprint sensor, and/or a voice recognition unit. Thus, individual elements and/or units can serve to record individual pieces of biometric data.

According to another preferred exemplary embodiment of the invention, the plurality of the local nodes is implemented in a back-end. The local nodes, in particular computers, are thus implemented in a back-end of the vehicle manufacturer, for example.

According to another preferred exemplary embodiment, data specific to individuals are encrypted, e.g., with a Private and Public method. A hash value is formed to form these encrypted data specific to individuals. This hash value is received in the block-chain as a reference.

According to a second aspect of the invention, there is a method for processing a plurality of users of a building and/or a means of transport, in particular a vehicle. Here, a copy of a block-chain is stored in a plurality of local nodes, and a processing request of a user is received, and the processing request is verified by comparing a piece of processing information with the stored block-chain on at least one of the local nodes, in order to grant access authorization to the user, wherein the processing information includes a piece of information from biometric data of the user, and wherein a local node from a plurality of local nodes is provided, in which the biometric data of the user are saved, wherein, when access authorization is granted to the user in a station of the block-chain, the positive check result from this station is also entered into the block-chain, and the block-chain is distributed to the further nodes from the plurality of local nodes.

According to a preferred exemplary embodiment of the invention, driving authorization is granted to the user by means of the processing information if the access authorization is granted.

According to another preferred exemplary embodiment of the invention, individual blocks of the block-chain are encrypted with at least one private and/or at least one public key.

A further idea of the invention is to provide a local node in the block-chain method in which biometric data of authorized users or persons are stored. If the biometric data, which are read out in the vehicle or at the building by a potential user using processing units or receiving devices, are forwarded to the local nodes and detected at these, the corresponding user is found by this local node, for example by the DISP, in the corresponding database, for example in the Proprietary Centralized Database (PCDB). The name of the user is then entered into the block-chain, and it is checked at one of the nearest stations of the block-chain as to whether this name is entered in this station of the granted access authorization. If this is the case, the positive check result is also entered into the block-chain by this station and distributes the block-chain to the further nodes of the system chain.

Advantageously, the names of individual users or participants do not have to be forwarded to all nodes. If accomplishing this is still desired, a further encryption of the blocks of the block-chain containing the names can preferably be provided.

Further advantages of the invention are an exceptionally secure authorization allocation for fleet vehicles or for shared services of vehicles to desired target persons or users, without these target persons requiring a mobile terminal if they want to use the vehicle or individual vehicle functions, such as opening the boot, for example.

The invention is explained in more detail below by means of a preferred exemplary embodiment with reference to the drawing.

BRIEF DESCRIPTION OF THE DRAWING

FIGURE

Here are shown:

FIG. 1 a processing system for a plurality of users of a vehicle in a system chain according to an exemplary embodiment of the invention.

DETAILED DESCRIPTION

As can be seen in FIG. 1, a processing system for a means of transport 1 is depicted, which, in the exemplary embodiment of the invention, constitutes a vehicle. The processing system comprises several computing units, which correspond to the plurality of local nodes and are arranged in the means of transport 1, wherein each computing unit is designed to store a copy of a block-chain. The processing system further comprises a processing unit 2, in particular a receiving device for recording biometric data, which is coupled to the computing units, and is designed to receive a processing request of a user. This processing request is verified by comparing a piece of processing information with the stored block-chain on at least one computing unit in order to grant access authorization to this user. Here, the processing information includes a piece of information from biometric data of the user.

In the exemplary embodiment of the invention, the information from biometric data includes information comprising genetic fingerprint, voice timbre, and facial geometry. The access authorization includes an authorization for the central locking system and for actuating individual doors, in particular the door to the trunk, of the vehicle. The processing unit 2 grants driving authorization to the user by means of the processing information after access authorization is granted, in order to deactivate an engine immobilizer of the vehicle. In the exemplary embodiment of the invention, a camera 3, a fingerprint sensor 4, and a voice recognition unit 5 are provided as the processing unit 2.

Furthermore, in the exemplary embodiment of the invention, a Distributed Machine Identification and Access Management Ledger 11 (DMIAL) is provided, which supports a method for checking the identity and access authorizations of the computing units in the means of transport 1. In the DMIAL 11, a Local Machine Identity and Access Database 9 (LMIADB) is provided. Furthermore, a Distributed Human Identity Management Ledger 12 (DHIL) is provided and which supports a method for checking the identity of the users who wish to have access to the vehicle, wherein the DHIL 12 further comprises a Local Human Identity Database 10 (LHIDB).

To register, the user must register once in the system with their personal account. The user should have access to the vehicle at least once using a standardized access method. So long as access has been allowed, the authorized person has to scan and store their biometric data using the computing units of the means of transport 1; the authorized person then has to confirm that these are their biometric data. Here, in the exemplary embodiment of the invention, the biometric data are stored in the vehicle. In other preferred exemplary embodiments of the invention, the biometric data are stored on a mobile terminal of a user, for example on a smartphone or in the DISP 7. In order to obtain access, the authorized person must effect a corresponding action on the website of the PCBS 6 using their account. The authorized person can then input their biometric data via the processing unit 2 of the means of transport 1. If the authorized person has been identified, access to the means of transport 1 is ensured.

In other preferred exemplary embodiments of the invention, the authorized user can prompt a biometric scan with the DISP 7, in particular by checking the identity in comparison to a DIA 8. Thus, the biometric recognition can thus be used by using pre-trained data stored locally and also in a remote-controlled manner.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A processing system for a plurality of users of a building or vehicle, the processing system comprising:
    a plurality of local nodes arranged in the building or vehicle, wherein each local node stores a copy of a block-chain; and
    a processing unit, which is coupled to the local nodes, and is configured to receive a processing request of a user and to verify the processing request by comparing a piece of processing information with the stored block-chain on at least one of the local nodes, to grant access authorization to the user,
    wherein the processing information includes a piece of information from biometric data of the user,
    wherein one local node of the plurality of local nodes stores the biometric data of the user, and
    wherein, when the user is granted access authorization in a station of the block-chain, a positive check result from the station of the block-chain is also entered into the block-chain and the block-chain is distributed to further nodes from the plurality of local nodes.

2. The processing system of claim 1, wherein the piece of information from biometric data includes at least one piece of information comprising genetic fingerprint, finger line image, gait, facial geometry, hand geometry, hand line structure, hand vein structure, iris, body odor, body size, lip movement, voice timbre, nailbed pattern, ear shape, retina, speech, typing behavior on keyboards, signature, handwriting, and dental impression of the user.

3. The processing system of claim 1, wherein the access authorization includes authorization for a central locking system or authorization for actuating individual doors of the vehicle.

4. The processing system of claim 1, wherein the processing unit grants driving authorization to the user using the processing information if access authorization is granted, in order to deactivate an engine immobilizer of the vehicle.

5. The processing system of claim 1, wherein the processing unit comprises a camera, a fingerprint sensor, and a voice recognition unit.

6. The processing system of claim 1, wherein the plurality of the local nodes is implemented in a back-end.

7. The processing system of claim 1, wherein individual blocks of the block-chain include hash values as reference to encrypted data specific to individual users.

8. A method for processing a plurality of users of a building or a vehicle, the method comprising:
    storing a copy of a block-chain in a plurality of local nodes;
    receiving a processing request of a user;
    verifying the processing request by comparing a piece of processing information with the stored copy of the block-chain on at least one of the plurality of local nodes in order to grant access authorization to the user, wherein the processing information includes a piece of information from biometric data of the user; and
    storing, in one local node of the plurality of local nodes, the biometric data of the user, wherein, when the user is granted the access authorization in a station of the block-chain, a positive check result from the station of the block-chain is also entered into the block-chain and the block-chain is distributed to further nodes from the plurality of local nodes.

9. The method of claim 8, wherein driving authorization is granted to the user using a piece of processing information if the access authorization is granted.

10. The method of claim 8, wherein individual blocks of the block-chain are encrypted with at least one private key or at least one public key.

11. A method for processing a plurality of users of a building or a vehicle, the method comprising:
    storing a copy of a block-chain in a plurality of local nodes;
    receiving a processing request of a user;
    verifying the processing request by comparing a piece of processing information with the stored copy of the block-chain on at least one of the plurality of local nodes in order to grant access authorization to the user, wherein the processing information includes a piece of information from biometric data of the user; and
    storing, in one local node of the plurality of local nodes, the biometric data of the user, wherein, when the user is granted the access authorization in a station of the block-chain, a positive check result from the station of the block-chain is also entered into the block-chain and the block-chain is distributed to further nodes from the plurality of local nodes, wherein the processing request is received from the user without using a mobile terminal and without using a smartphone.

12. The method of claim 8, wherein the plurality of local nodes are arranged in the building or in the vehicle.

* * * * *